May 4, 1943.   E. W. N. BOOSEY   2,318,049
PIPE COUPLING
Filed June 27, 1941
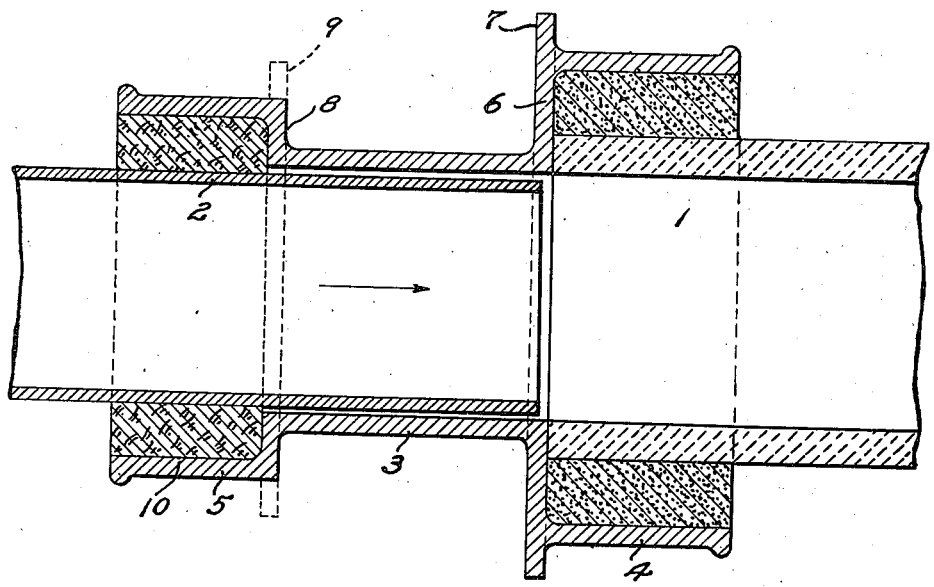
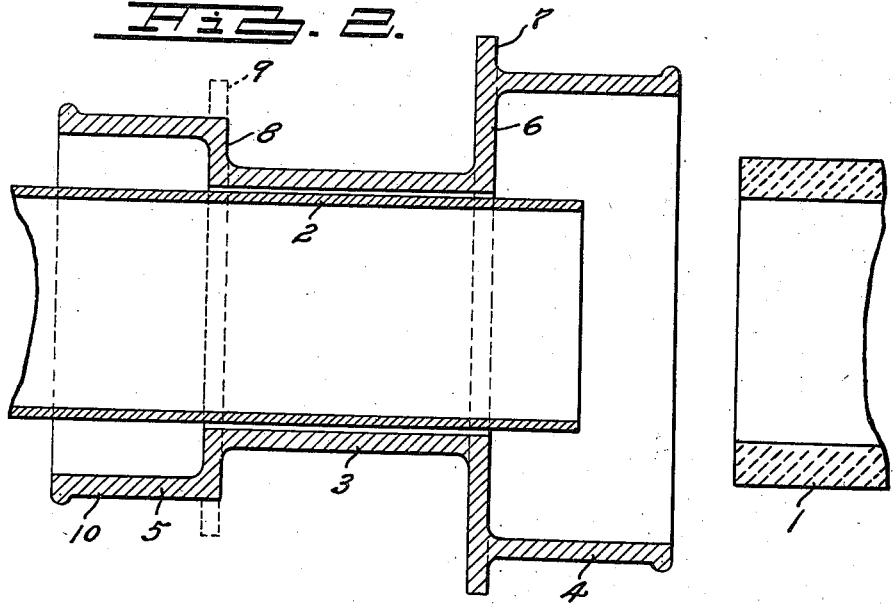
INVENTOR.
Edward W. N. Boosey
BY
ATTORNEY.

Patented May 4, 1943

2,318,049

UNITED STATES PATENT OFFICE 2,318,049

PIPE COUPLING

Edward W. N. Boosey, Detroit, Mich.

Application June 27, 1941, Serial No. 399,980

4 Claims. (Cl. 285—115)

This invention relates to pipe couplings for connecting sewer crock and iron pipe of different external diameters.

Heretofore, couplings have been utilized for connecting two pipes together which are usually of approximately the same external diameters and both are laid with the ends comparatively close together. It is somewhat difficult to insert a coupling between the ends of the pipe and crock or remove a broken tile and insert a new one without taking up considerable length of the tile crock drain. The purpose of this invention is to provide a connector or coupling that may be placed in position in the laying of the last crock of the tile drain adjacent the iron conduit which discharges thereto, and a feature of this invention is to provide a coupling of such character of construction as to enable the same to be introduced over the end of the iron pipe and moved longitudinally thereof to permit placing the end of the crock drain in axial alignment with the end of the iron pipe and coupling then moved over the crock to maintain the same in axial alignment.

A feature of the invention is further involved in the construction of a coupling having two opposite ends formed with the hubs and a flanged portion extending outwardly from one or both the said members to enter the earth and anchor the coupling from longitudinal movement.

A feature and object of the invention is further involved in the construction of a coupling having two opposite ends formed with the hubs and a flanged portion extending outwardly from one or both the said hubs to enter the earth and hold the coupling from longitudinal movement.

These and other objects and novel features of the invention are hereinafter more fully described and claimed, and the preferred form of construction of a pipe coupling embodying my invention is shown in the accompanying drawing in which—

Fig. 1 is a vertical section through the coupling and showing the relationship of the crock and iron pipe ends therewith.

Fig. 2 is a similar section showing the manner of introducing the coupling between the iron pipe and movable crock drain.

It has heretofore been the practice to provide coupling members of some type between iron pipe sections which is intended to be caulked to the respective sections which are usually of the same internal diameter and intended for permanent association.

The problem to be solved in connecting iron pipe with a crock sewer line differs due to the different diameters of the pipe and crock and which also differ in tensile strength and in expansion coefficient. Hot water tends to fracture the crock and by means of my improved coupling the crock is spaced from the iron pipe which is lead caulked to the coupling and may slip as the pipe elongates or contracts while the crock is cemented to the coupling. As hereinafter shown the coupling is held from longitudinal movement and thus the expansion and contraction of the iron pipe is not transmitted to the crock.

My improved coupling is for connecting a sewer crock 1 and an iron pipe 2 which in the structure shown is slightly less in external diameter than the internal diameter of the crock. For connecting the crock with the pipe, I provide an iron coupling 3 which has at its one end the horizontally extending circumferential hub 4 to receive the end of the crock and at the outer end a smaller diameter hub 5 while the body of the coupling is of a diameter to receive the end of the pipe 2 and is slidable thereon. The wall 6 forming the base of the hub portion 4 has a peripheral extension 7 beyond the hub 4 which, when laid in earth, additionally serves with the said wall 6 to prevent longitudinal displacement and the portion 8 of the hub portion 5 likewise performs similar function and may be provided with an extending portion or flange indicated by dotted lines 9.

It is intended to lead caulk iron pipe to the iron connector and therefore the hub 5 is spaced sufficiently from the pipe surface to provide a caulking space 10 which is filled with lead and requires to be hammered to place to seal the pipe 2 to the connector. In the act of caulking the iron pipe 2 in place, the connector is driven toward the crock member and the wall 6 engages the crock end and limits the extent of longitudinal movement of the connector 3 by the caulking operation. This practically closes the interstice between the end of the crock 1 and the wall 6. Cement is usually used to seal the crock to the hub and by practically closing the interstice between the end of the crock and the wall 6 of the connector, little if any cement can enter the interior of the pipe and provide an obstruction to flow therethrough which is in the direction of the arrow shown in Fig. 1.

In the laying of the last crock 1 of the sewer crock line the hub end 5 of the connector is slipped over the iron pipe and is moved longitudinally thereof a distance to enable the crock end to be aligned with the hub 4 which is considerably smaller in internal diameter than the outer diameter of the crock. The connector is then moved to position the hub 4 over the crock end. When the parts have been brought together in this relationship the iron pipe may enter the smaller diameter of the body of the coupling and then is moved longitudinally thereover a distance as may be required by the spacing of the end of the iron pipe 2 from the crock.

The iron pipe is then caulked in place as by a lead caulking as is usual thereby forcing the wall 6 to contact with the end of the crock section 1 and the crock section then finally cemented in place.

If at sometime after the laying of the pipe, the crock drain requires to be taken up or removed to replace a broken section the cement is broken from the crock section 1 to enable the same to be removed to permit introduction of another section at this point. The coupling may then be moved axially over the end of the iron pipe and thereafter a new crock section may be introduced into the coupling and the coupling repositioned and cemented in place as hereinbefore described.

It is preferable that the inner diameter of the body 3 of the coupling be approximately the same as the inner diameter of the crock to be assembled therewith and preferably a little greater in diameter than the outer diameter of the iron pipe 2. Thus, as the flow is from the iron pipe to the crock, there is no obstruction to flow.

It is believed evident from the foregoing description that the pipe coupling as shown and described embodies the various features and objects of the invention—that is, a simple and inexpensive coupling wherein the crock cannot enter the body of the coupling but the iron pipe may be located therein and the anchoring feature prevents dislocation of the crock.

Further the elongation and construction of the iron pipe by heated water discharging thereinto at some distance from the crock is also not transmitted to the crock and that the structure provides a coupling readily assembled in place and adjusted to position in respect to the crock and the iron pipe ends. It is to be further understood that various changes may be made in the coupling without departing from the spirit and scope of the invention as set forth in the appended claims.

Having thus fully described my invention, its utility and mode of operation, what I claim and desire to secure by Letters Patent of the United States is—

1. A coupling for connecting iron pipe and crock sections, comprising a cast metal body of cylindrical form and of an internal diameter in excess of the external diameter of the iron pipe to enable the coupling to be slipped thereover, a hub at the iron pipe end of the coupling, and a hub at the opposite end for the crock, one of said hubs having a peripheral flange providing a means for anchoring the same to prevent longitudinal displacement thereof when laid in earth the body of the coupling being less in internal diameter than the external diameter of the crock and the second named hub extending thereover to provide a space for material to seal the crock to the coupling.

2. A cast iron coupling for connecting iron pipe and crock sections of a drain, comprising a body of unbroken cylindrical form from end to end having an internal diameter greater than the external diameter of the iron pipe enabling the coupling to be slipped over the pipe to permit the crock drain to be laid in close association and axial alignment with the pipe and to thereafter move the coupling on the iron pipe to engage the crock end, said coupling having a hub portion greater in diameter than the iron pipe on the one end to enable caulking of the iron pipe to the iron connector and a hub greater in diameter than the diameter of the crock at the opposite end to provide a space therebetween for sealing material, the said crock end having an external diameter greater than the internal diameter of the iron pipe.

3. A metal coupling for connecting iron pipe and crock sections of a drain, comprising a body of cylindrical form having an internal diameter greater than the external diameter of the iron pipe, a hub at one end for caulking the coupling to the iron pipe, and a hub on the opposite end of the coupling for receiving the end of a crock, said crock having an internal diameter approximately equal to the internal diameter of the pipe, and an external diameter greater than the external diameter of the body, said hub receiving the crock end being of a diameter providing a space for cementing the crock therein and the hubs being of greater diameter than the body providing surfaces tending to anchor the coupling in the material in which the drain is laid thereby preventing elongation and contraction of the iron pipe from being transmitted to the crock drain.

4. A metal coupling for connecting iron pipe and crock sections of a drain, comprising a body of cylindrical form having an internal diameter greater than the external diameter of the iron pipe, a hub at one end for caulking the coupling to the iron pipe, a hub on the opposite end of the coupling for receiving the end of a crock having an internal diameter approximately equal to the internal diameter of the body of the coupling, said hub receiving the crock end being of a diameter providing a space for cementing the crock therein, at least one of the hubs having a laterally extending flange providing an anchor in earth in which the drain is laid thereby preventing elongation and contraction of the iron pipe from being transmitted to the crock drain.

EDWARD W. N. BOOSEY.